US009307610B2

United States Patent
Vo (10) Patent No.: US 9,307,610 B2
(45) Date of Patent: Apr. 5, 2016

(54) LOW POWER BYPASS CIRCUIT FOR LED OPEN CIRCUIT AND REVERSE POLARITY PROTECTION

(71) Applicant: General LED, Inc., San Antonio, CA (US)

(72) Inventor: Vung Van Vo, San Antonio, CA (US)

(73) Assignee: General LED, Inc., San Antonio, TX (US)

( * ) Notice: Subject to any disclaimer, the term of this patent is extended or adjusted under 35 U.S.C. 154(b) by 0 days.

(21) Appl. No.: 14/645,540

(22) Filed: Mar. 12, 2015

(65) Prior Publication Data

US 2015/0312976 A1    Oct. 29, 2015

Related U.S. Application Data

(60) Provisional application No. 61/983,137, filed on Apr. 23, 2014.

(51) Int. Cl.
*H05B 33/08* (2006.01)
*H05B 37/03* (2006.01)
*H05B 41/46* (2006.01)

(52) U.S. Cl.
CPC ........ *H05B 33/0893* (2013.01); *H05B 33/0824* (2013.01); *H05B 37/03* (2013.01); *H05B 41/46* (2013.01); *Y02B 20/341* (2013.01)

(58) Field of Classification Search
USPC ...... 315/209 SC, 209 R, 209 T, 209 CD, 291, 315/312, 185 S, 247, 246, 119, 123, 125, 315/122, 184, 185 R, 200 R, 207
See application file for complete search history.

(56) References Cited

U.S. PATENT DOCUMENTS

| 4,653,084 A * | 3/1987 | Ahuja ........................ 379/27.06 |
| 7,872,428 B1 * | 1/2011 | Papanicolaou ................ 315/291 |
| 8,410,705 B2 * | 4/2013 | Bollmann et al. ............. 315/119 |
| 2009/0323238 A1 * | 12/2009 | Gehrke ........................... 361/56 |
| 2010/0049454 A1 * | 2/2010 | Irissou et al. .................... 702/58 |
| 2011/0068706 A1 * | 3/2011 | Otake et al. ................... 315/291 |
| 2012/0062146 A1 * | 3/2012 | Huang et al. .................. 315/294 |
| 2013/0307430 A1 * | 11/2013 | Blom ........................ 315/209 R |
| 2016/0014860 A1 * | 1/2016 | Yoo ...................... H05B 33/083 315/191 |

* cited by examiner

*Primary Examiner* — Tuyet Vo
(74) *Attorney, Agent, or Firm* — Alan R. Thiele; William H. Quirk; Rosenthal Pauerstein Sandoloski Agather LLP (57) ABSTRACT

A low power bypass circuit for use with a string of series-connected LEDs includes a semiconductor diode and resistor connected in series, which semiconductor diode and resistor combination become conductive upon the failure of an LED or upon the improper, reverse polarity connection of the string of series-connected LEDs to a power supply. When the semiconductor and resistor combination becomes conductive, a three-terminal gate-controlled semiconductor switching device becomes conductive, thereby bypassing the failed LED and protecting the integrity of the string of series-connected LEDs upon the improper reverse polarity connection of the string of series-connected LEDs to a power supply.

4 Claims, 8 Drawing Sheets

PRIOR ART

FIG. 1

PRIOR ART

LOW POWER BYPASS CIRCUIT FOR LED OPEN CIRCUIT AND REVERSE POLARITY PROTECTION

CROSS REFERENCE TO RELATED APPLICATION

This Non-Provisional U.S. Patent Application claims the benefit of Provisional U.S. Patent Application No. 61/983,137 filed Apr. 23, 2014.

STATEMENT REGARDING FEDERALLY FUNDED RESEARCH AND DEVELOPMENT

The low power bypass circuit described in this patent application was not the subject of federally sponsored research or development.

FIELD

The disclosed circuit pertains to systems including a power supply and one or more Light Emitting Diodes (LEDs). More particularly, the disclosed circuit pertains to maintaining the integrity of a string of LEDs when one or more LEDs in a string of LEDs fails or when a string of series-connected LEDs is improperly connected to a direct current (DC) electrical energy power supply.

BACKGROUND

An LED is a rectifying semiconductor device which converts direct current electrical energy into light energy. Unlike most incandescent or fluorescent lights, an LED operates using only a direct current (DC) or a one-way flow of electrical energy as opposed to a two-way flow of alternating current (AC) of electrical energy where the polarity and the direction of the flow of electrical energy reverses many times per second.

Each LED has a positive polarity connection or anode and a negative polarity connection or cathode. The direct current or the forward flow of electrical current flow is from the anode of the LED to the cathode of the LED.

Figure 1:
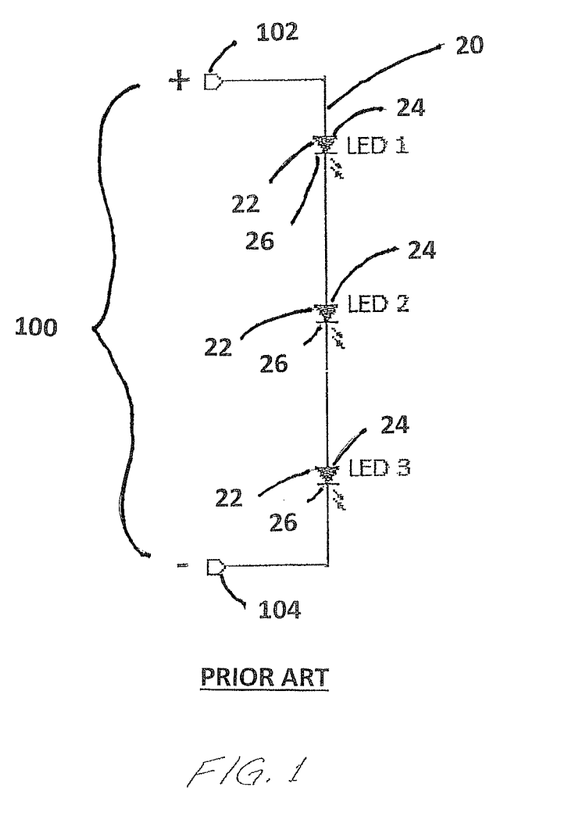
FIG. 1 is a schematic of a prior art string of series-connected LEDs.

Typically, in prior art strings of series-connected LEDs 100, individual LEDs 22 are normally assembled, one to another, in a series circuit 20 as shown in FIG. 1. Therein, it is shown that the anode 24 of the first LED in a string of series-connected LEDs is connected to the positive polarity 102 of a direct current power supply. The cathode 26 of each LED is connected to the anode 24 of the next LED in the string of series-connected LEDs. The cathode of the last LED in the string of series-connected LEDs is connected to the negative polarity 104 of the direct current power supply, thereby closing the direct current circuit and causing each LED in the direct current circuit to emit light energy.

As in any series-connection of electrical components, a break in the series connected string of LEDs renders the circuit no longer conductive, thereby no electrical energy will flow from the positive polarity of the power supply to the negative polarity of the power supply.

When a single LED in a string of series-connected LEDs fails, none of the LEDs in the string of LEDs will emit light energy as there can be no flow of electrical energy from the positive polarity of the direct current electrical energy power supply to the negative polarity of the direct current electrical energy power supply.

If a string of series-connected LEDs is used as a light source, for example in an illuminated sign, the light source which illuminates the sign is typically multiple strings of series-connected LEDs. Each of the strings of series-connected LEDs contains multiple individual LEDs. If one individual LED in a string of series-connected LEDs fails, this is called an LED open circuit. The string of series-connected individual LEDs containing the failed LED does not provide a closed circuit from the positive polarity of the direct current electrical energy power supply to the negative polarity of the direct current electrical energy power supply. Accordingly, none of the LEDs in the string of series-connected LEDs will emit light energy. The loss of an entire string of series-connected LEDs will significantly reduce the total light output of a lighting system; including multiple strings of series-connected LEDs, and create a noticeable dark spot on the surface of an illuminated sign. When there is a loss of a complete string of series-connected LEDs in a device such as an illuminated sign, the manufacturer may be required to disassemble the sign and replace one or more complete strings of series-connected connected LEDs. Such need to replace a complete string of series-connected LEDs increases manufacturer's warranty costs and user maintenance costs.

Figure 2:
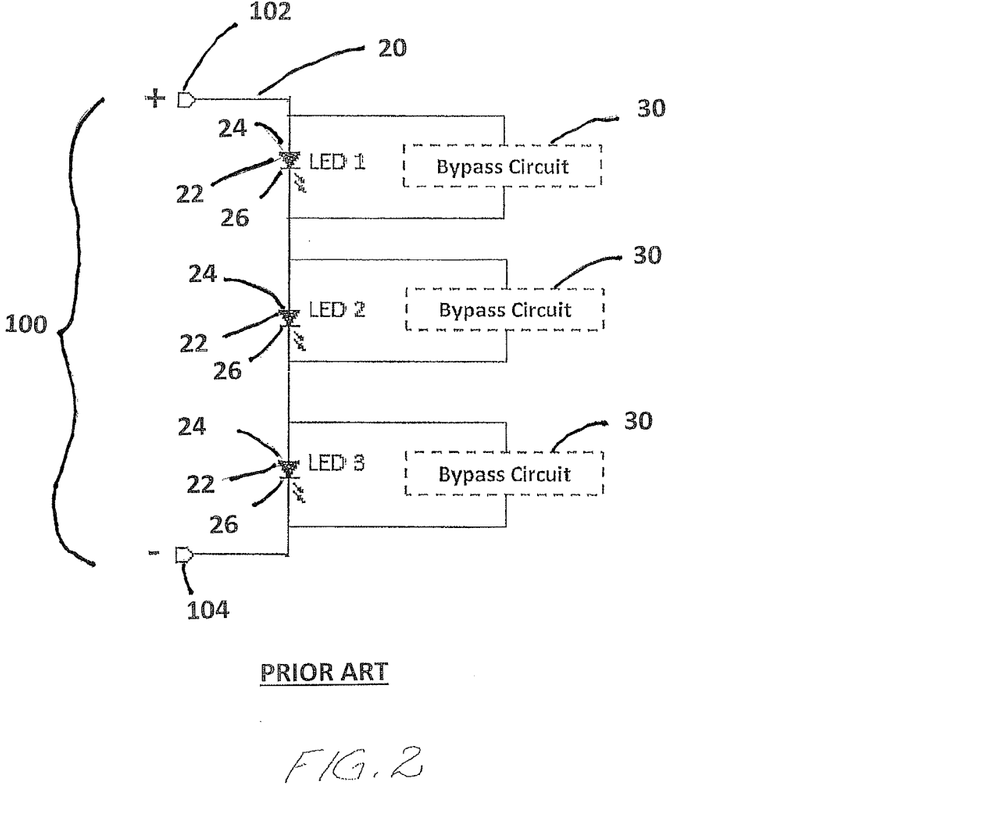
FIG. 2 is a schematic of prior art string of series-connected LEDs including bypass circuits.

As shown in FIG. 2, the problem of a single failed LED in a string of series-connected LEDs is typically solved in the prior art by placing a bypass circuit 30 in parallel with or around an individual LED in a string of series-connected LEDs. Thus, when a single LED fails in a string of series-connected LEDs, the direct current flow of electrical energy passes through the bypass circuit around the failed LED and on to the operating LEDs positioned after the failed LED in the string of series-connected LEDs. For a multi-LED light source, the loss of a single LED in a string of series-connected LEDs makes only a small difference in the amount of illumination provided by multiple series strings of LEDs. Thus, if there is the loss of but a single LED, the manufacturer of the illuminated sign will typically not be required to replace an entire string of series-connected LEDs.

The prior art bypass circuits shown in FIG. 2 are configured to be used with each individual LED in a string of series-connected LEDs. In normal operation, an individual LED is conductive; that is, the individual LED allows electrical current to pass therethrough. But when an LED open circuit condition is created, no electrical energy flows through the individual LED. Instead the electrical energy flows through the conductive bypass circuit formed around the failed LED. That is, in normal operation the electrical componentry in the bypass circuit around the LED renders the bypass circuit non-conductive. It is only when an individual LED fails and will not allow any electrical energy to pass therethrough that the electrical energy which formerly passed through the LED activates electrical componentry in the bypass circuit and makes it conductive to the flow of electrical energy. Once activated, the bypass circuit enables the passage of electrical energy around the failed LED to the next individual LED in the string of series-connected LEDs so that the next individual LED in the string of series-connected LEDs operates normally and the flow of electrical energy through the string of series-connected LEDs is restored.

Prior art bypass circuits for use in a series string of LEDs typically include a zener diode. A zener diode is a two-terminal semiconductor junction device which is normally non-conductive to the flow of electrical energy; that is, no electrical energy passes therethrough. However, when electrical current of a predetermined voltage is applied to the zener diode, the zener diode becomes conductive; that is, the zener diode allows electrical energy to flow therethrough.

When an LED is operating normally, that is emitting light energy, the forward voltage needed to cause the zener diode (about 4.2 volts) to become conductive to the flow of electrical energy is higher than the forward voltage needed to enable the flow of electrical energy through an operable individual LED (about 3.2 volts). Thus, electrical energy flows through the individual LED and does not flow through the zener diode when the individual LED is operating normally. When an LED fails, the electrical resistance of the failed LED goes to infinity, and no amount of electrical energy or forward voltage will enable electrical energy to pass through the failed LED. Accordingly, the voltage from the direct current electrical energy power supply will flow to the zener diode. The electrical energy voltage from the direct current electrical energy power supply will cause the zener diode to become conductive to the flow of electrical energy therethrough. When the zener diode in a bypass circuit is conductive, the bypass circuit is active so that a current path around the failed LED or bypassing the failed LED is provided. As explained above, by the use of prior art bypass circuits, including a zener diode, the loss of a single LED will not shut down an entire string of LEDs.

While the use of a zener diode will enable the electrical energy from a direct current electrical energy power to bypass a failed LED in a string of series-connected LEDs, the use of a zener diode also presents certain problems which can affect the operation of a series-connected string of LEDs. These problems come from the heat energy generated by a zener diode. This heat energy is higher than the heat energy generated by an LED. When the amount of electrical current needed by the string of series-connected LEDs is low, such as when there is a small number of LEDs or when the light output from the LEDs is low, the generation of heat energy is not usually a problem. But when the amount of current needed by the string of series-connected LEDs is high, the generation of heat energy caused by the use of a zener diode becomes a problem, and a heat sink may now be needed to dissipate the heat energy emitted by the zener diode. The use of a heat sink to dissipate the heat generated by multiple zener diodes in the bypass circuit around each individual LED increases the size, the weight and the cost of an LED light source system.

In addition, when the bypass circuit around each individual LED is activated, the total voltage across the string of series-connected LEDs increases. This increased voltage increases the electrical energy consumption of the string of series-connected LEDs. If enough bypass circuits in a string of series-connected LEDs are activated, the total electrical energy available from the direct current power supply may be exceeded or the maximum allowable direct current voltage from a constant amperage power supply may be surpassed. In such cases, this need for additional electrical energy or additional voltage may shorten the life of the constant amperage direct current electrical energy power supply.

Another problem occurs when a string of series-connected LEDs is improperly connected with respect to the polarity of a direct current power supply. Specifically, a portion of the string of series-connected LEDs which should be connected to a positive side of the direct current power supply is connected to the negative side of the direct current power supply. When this occurs, the LEDs will fail and the entire string of series-connected LEDs which is improperly connected to a direct current power supply will have to be replaced. To prevent the failure of the string of series-connected LEDs, there is a need to protect each LED in the string of series-connected LEDs with a bypass circuit.

Accordingly, there remains a need in the art for a low power bypass circuit connected in parallel around an individual LED which becomes operative when an LED fails or becomes operative when a string of series-connected LEDs has been improperly connected to a direct current power supply. Further, such low power bypass circuit should enable the use of minimal electrical energy so that a heat sink for dissipation for generated heat energy is not required nor is a voltage which exceeds the normal operating capacity of the direct current power supply required.

SUMMARY

The disclosed circuit provides a low power bypass circuit which becomes operative when either an LED fails or a string of series-connected LEDs is improperly connected to direct current electrical energy power supply. The disclosed circuit will generate much less heat and consume much less electrical energy than the electrical energy consumed by the use of a prior art zener diode bypass circuit. This is because the activation of the disclosed low power bypass circuit for an LED open circuit or a reverse polarity condition requires much less voltage than a commonly used zener diode or an LED.

The components of the disclosed low power bypass circuit are a two-terminal semiconductor diode, preferably a two-terminal semiconductor diode specially fabricated to use zener breakdown, a three-terminal gate-controlled semiconductor current switching device, commonly called a triac, and a resistor. The resistor has an electrical resistance which enables the threshold voltage applied to the triac to cause the triac to become conductive; that is, the triac allows the flow of electrical energy from either terminal of the triac to the other terminal of the triac. Specifically, electrical energy flow in one direction through the triac causes the low power bypass circuit of the present invention to act as a bypass circuit in the event of an open LED condition. Flow of electrical energy in the other direction through the triac causes the low power bypass circuit of the present invention to provide reverse polarity protection when the string of series connected LEDs is improperly connected to the direct current power source.

When the LED is operating normally, the zener diode is non-conductive, therefore, no electrical energy flows through the zener diode because the voltage needed for electrical energy to flow through LED is less than the threshold voltage needed for the zener diode to become conductive. Because there is no electrical current to cause the zener diode to become conductive, no electrical current passes to the triac to make it conductive.

The triac is a three-terminal gate-controlled semiconductor current switching device typically used in alternating current circuits. Unless activated, the triac does not normally allow electrical energy to pass from a first terminal to a second terminal or from the second terminal to the first terminal. When electrical current is sent to the third or gate-control terminal of the triac, the triac becomes conductive and there is a path for the electrical energy to flow from either the first terminal of the triac to the second terminal of the triac or from the second terminal of the triac to the first terminal of the triac. Activation of the conductivity of the triac requires that electrical energy of predetermined voltage be applied to the gate-control terminal of the triac. A resistor is used to raise the voltage of the electrical current to the level needed to activate the conductivity of the triac.

When an LED fails, the flow of electrical energy from the direct current electrical power supply now goes through the zener diode, thus causing the zener diode to become conductive. From the zener diode, the flow of electrical energy is directed to the gate-control terminal of the triac. Receipt of the electrical energy at the gate-control terminal of the triac causes the electrical path between the terminals of the triac to be conductive in either direction. This flow of electrical energy through the triac bypasses an LED which has either failed or is part of a string of series-connected LEDs which has been improperly connected to a power supply.

Because of this flow of electrical energy through the triac, the bypass circuit around the failed LED is now conductive and the operative LEDs positioned after the failed LED in the string of series-connected LEDs will emit light.

Because the forward voltage needed for both the electrical energy to flow between the terminals of the triac (about 1 volt), the flow of electrical energy through the zener diode is substantially reduced once the triac becomes conductive. Thus, the zener diode effectively drops out of the low power bypass circuit of the disclosed circuit after a very short period time as the electrical energy follows the path of the least electrical resistance, which is through the triac and through and on to the remaining operative LEDs in the string of series-connected LEDs. As the zener diode is effectively no longer in the bypass circuit, the power consumption of the zener diode and the heat produced by the zener diode are reduced, but the disclosed low power bypass circuit remains conductive.

When a string of series-connected LEDs is improperly connected to a power supply; that is, when the polarity of the flow of direct current electrical energy is reversed with respect to the string of series-connected LEDs, the disclosed low power bypass circuit will enable the flow of direct current electrical energy through the triac in a direction opposite to the flow of electrical energy in the open LED circuit condition, thereby protecting each individual LED until the connection of the string of series-connected LEDs to the direct current electrical power supply is reversed.

BRIEF DESCRIPTION OF THE DRAWING FIGURES

A still better understanding of the low power bridge circuit for open LED and reverse polarity protection may be had by reference to the drawing figures wherein.

DESCRIPTION OF THE EMBODIMENTS

The following description of the low power bypass circuit 10 of the disclosed circuit with reference to the drawing figures begins with a description of the normal operation of the string or series-connected LEDs 22 (FIG. 1). In FIG. 2, a parallel bypass circuit 30 is connected around each LED. This parallel bypass circuit 30 is not conductive while each individual LED 22 is operating normally.

Figure 3:
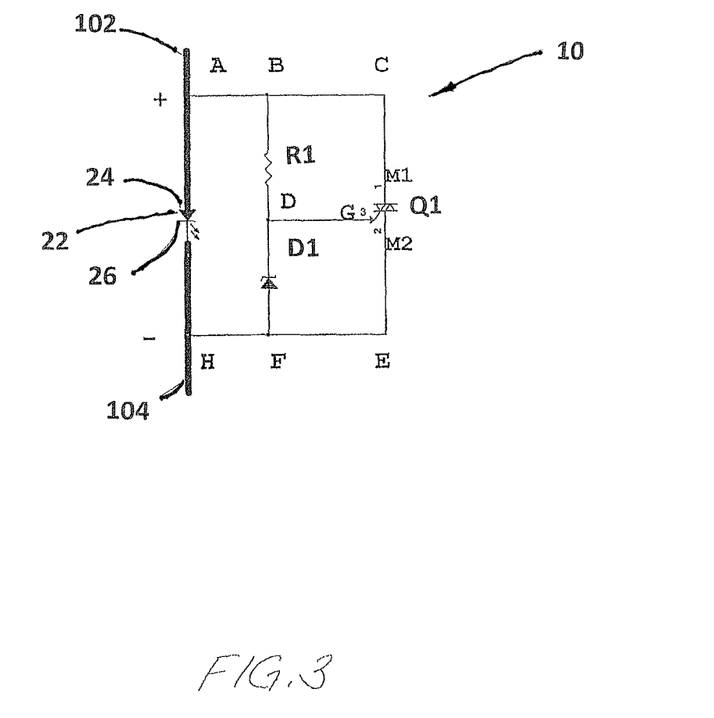
FIG. 3 is a schematic of the current flow through the disclosed circuit when the LED is operating normally and the disclosed low power bypass circuit is not conductive.

When the disclosed low power bypass circuit 10, as shown in FIG. 3, becomes conductive, the first step which makes the disclosed low power bypass circuit 10 conductive is shown along with the second step (FIG. 4) which illustrates the continuing operation of the low power bypass circuit 10 once the low power bypass circuit 10 is made conductive.

Shown in FIG. 3 is the normal operation of an individual LED 22 in a string 100 of series-connected LEDs. The forward flow of electrical energy or the flow of direct current electrical energy is from the positive terminal 102 of the direct current electrical energy supply to the anode 24 or positive side of the LED, then through the LED 22. It is this flow of electrical energy through the LED 22 which causes the LED to produce light energy. The forward flow of electrical energy (positive to negative) through the LED 22 exits the LED 22 at the cathode 26 or negative side of the LED 22 and proceeds on to the anode of the next LED in the string of series-connected LEDs. The disclosed low power bypass circuit 10 is connected around or in parallel to each individual LED by the wires which provide electrical energy to the LED 22 at points A and H. When the individual LED 22 is operating properly and inserted into the string 100 of series-connected LEDs properly, as shown in FIG. 3, the low power bypass circuit 10 is not conductive. Thus, no electrical energy enters the low power bypass circuit 10.

Figure 4:
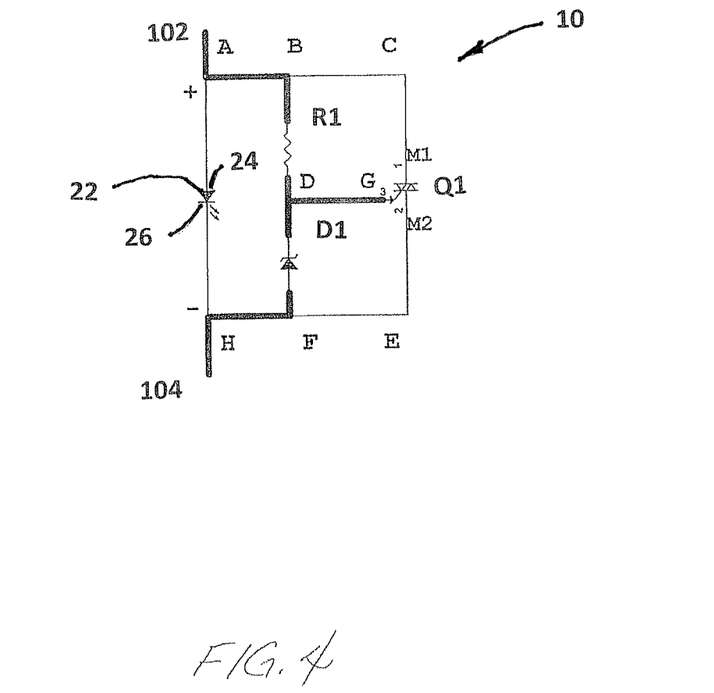
FIG. 4 is a schematic illustrating the current flow through the disclosed low power bypass circuit when the LED fails.

Shown in FIG. 4 is the current flow through the low power bypass circuit 10 when the individual LED 22 fails for some reason. Because an individual LED 22 has failed, there is no longer a conductive circuit through the LED 22; that is, there is no longer a conductive path for the electrical energy to flow from the positive side 102 of the direct current electrical energy supply to the negative side 104 of the direct current electrical energy supply. The only conductive path for the flow of electrical energy is through the Resistor R1, to the two-terminal zener diode D1. This path of the flow electrical energy is designated in FIG. 4 as A B D F H.

There is enough electrical energy from the direct current power supply to allow electrical energy to flow through resistor R1 and to provide the necessary voltage (about 4.2 volts) to the two-terminal zener diode D1 to make it instantaneously conductive. Because the bypass circuit has been made instantaneously conductive by the two-terminal zener diode D1, a portion of the electrical energy also flows from D to G. Connection G is Pin 3 or the gate-control terminal of the triac Q1. This flow of electrical energy from D to G has sufficient voltage to cause the triac Q1 to become conductive. Once the triac Q1 becomes conductive, electrical energy will flow either from Pin 1, M1, to Pin 2, M2, of the triac Q1 or from Pin 2, M2, to Pin 1, M1 of the triac Q1.

Figure 5:
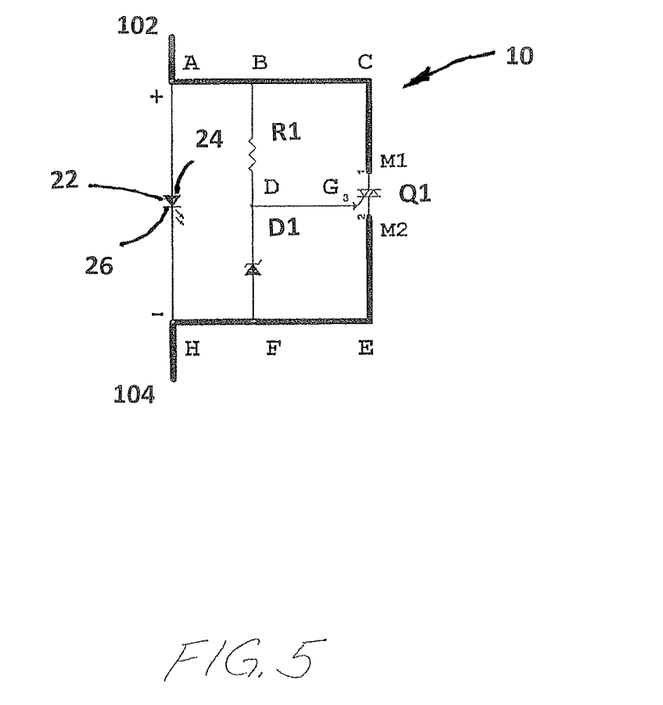
FIG. 5 is a schematic illustrating the resumption of current flow enabled by the disclosed circuit after an LED fails.

As shown in FIG. 5, when triac Q1 becomes conductive, the passage of electrical energy therethrough either from Pin1 to Pin 2 of the triac Q1 or from Pin 2 to Pin 1 of the triac Q1 requires about 1 volt. Thus, the path of least electrical resistance for the flow of electrical energy is between Pin 1 and Pin 2 of the Triac Q1. Accordingly, the flow of electrical energy through Resistor R1 or through the zener diode D1 is substantially reduced.

Once rendered conductive between Pin 1 and Pin 2 of the triac Q1, a continuing flow of electrical energy to Pin 3 of the triac Q1 is not required; that is, the triac remains conductive. Accordingly, in the second step of the low power bypass circuit 10 of the present invention, the forward flow of electrical energy is shown in FIG. 5, that is along the path designated as A B C M1 M2 E F H. The forward flow of electrical energy will continue along the path A B C M1 M2 E F H until the failed individual LED 22 has been replaced with a properly oriented operative individual LED.

Figure 6:
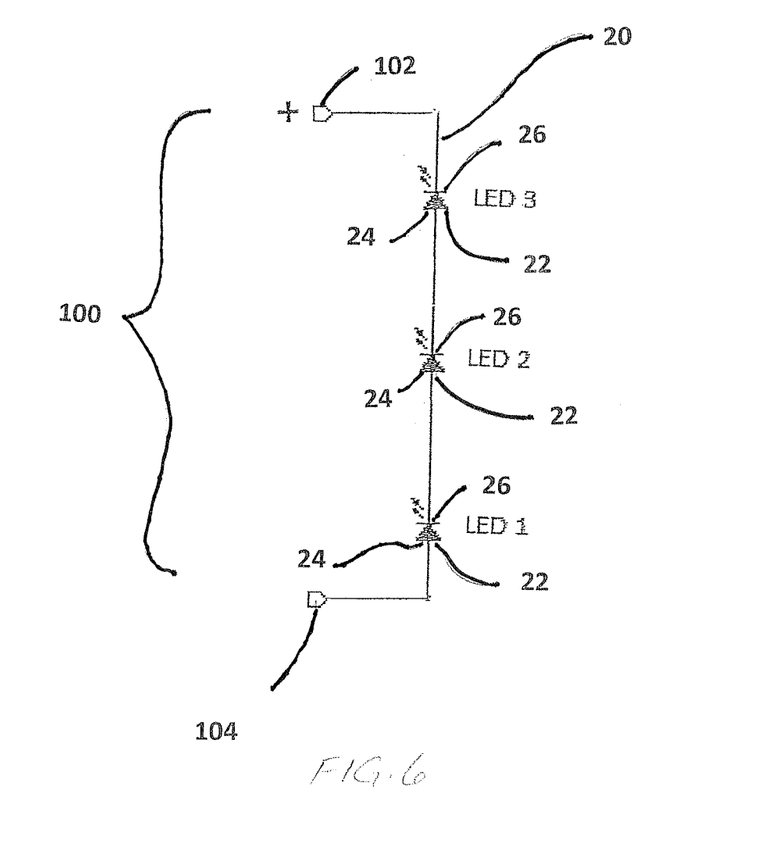
FIG. 6 is a schematic illustrating a string of series-connected LEDs improperly connected to a direct current electrical power supply.

In the situation shown in FIG. 6 where a string 100 of series-connected LEDs 22 is improperly connected to the direct current electrical energy supply and a reverse polarity of the flow of electrical energy is applied to the string 100 of series-connected LEDs, there is the possibility that one or more of the individual LEDs 22 or the direct current power supply may become inoperative. Accordingly, there is a need for a bypass circuit which protects each individual LED 22 and the direct current power supply when the string 100 of series-connected LEDs is subject to a reverse polarity of flow of electrical energy.

When the string 20 of series-connected LEDs is subjected to a reverse polarity flow of electrical energy, the current flow, as depicted in FIG. 3, does not exist. Instead, there is an immediate need to send the electrical energy through the low power bypass circuits 10 of the present invention which are connected in parallel around each individual LED 22. Herein, the same bypass circuit which is used to bypass a failed individual LED 22 in the LED open circuit condition shown in FIG. 4 may be used to protect each LED 22 where the string 20 of series-connected LEDs is subjected to a reverse polarity.

Figure 7:
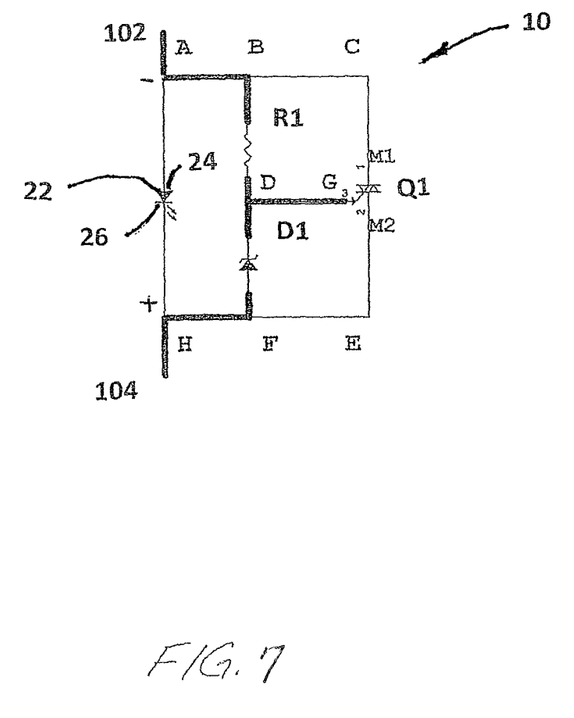
FIG. 7 is a schematic illustrating the current flow through the low power bypass circuit of the present invention when a string of series-connected LEDs has been improperly connected to a direct current power supply, thereby resulting in a reverse polarity of electrical energy being applied to the string of series-connected LEDs.

In FIG. 7, the flow of electrical energy when the string of series-connected LEDs is improperly connected (reverse polarity) to the power supply is shown. Herein, the reverse flow of current will not pass through the LED 22 as it requires a greater voltage for the electrical energy to pass through the LED 22 from the cathode 26 or negative polarity side of the LED to the anode 24 or positive polarity side of the LED. The voltage required to allow the flow of electrical energy to flow through the two-terminal zener diode D1 according to a reverse current flow (about 0.7 volts) is sufficient to cause the two-terminal zener diode D1 to become conductive, thereby allowing the flow of electrical energy therethrough and then through the resistor R1 and back to the top of the connection to the parallel bypass circuit above the LED. A portion of the flow of electrical energy that has passed through the zener diode D1 is conducted to the third or gate-control terminal of the triac Q1. This flow of electrical energy to the gate-control terminal of the triac Q1 make the triac Q1 conductive; that is, a path for the flow of electrical energy from Pin 2, M2, to Pin 1, M1 of the triac Q1 is now conductive. This flow of electrical energy through the triac Q1 is opposite to the flow of electrical energy through the triac Q1 in the open LED circuit condition.

The voltage required to maintain the flow of electrical energy between Pin 2, M2, and Pin 1, M1 of the triac Q1 is about 1 volt. This path for the flow of electrical energy is illustrated in FIG. 7 as H F D G and H F D B A.

Once the flow of electrical energy to the third or gate-control terminal of the triac Q1 causes the triac Q1 to become conductive, thereby allowing electrical energy to pass from Pin 2, M2 to Pin 1, M1 of the triac Q1. The triac Q1 remains conductive and the need for a continuing flow of electrical energy along the path D G as shown in FIG. 7 no longer exists.

Figure 8:
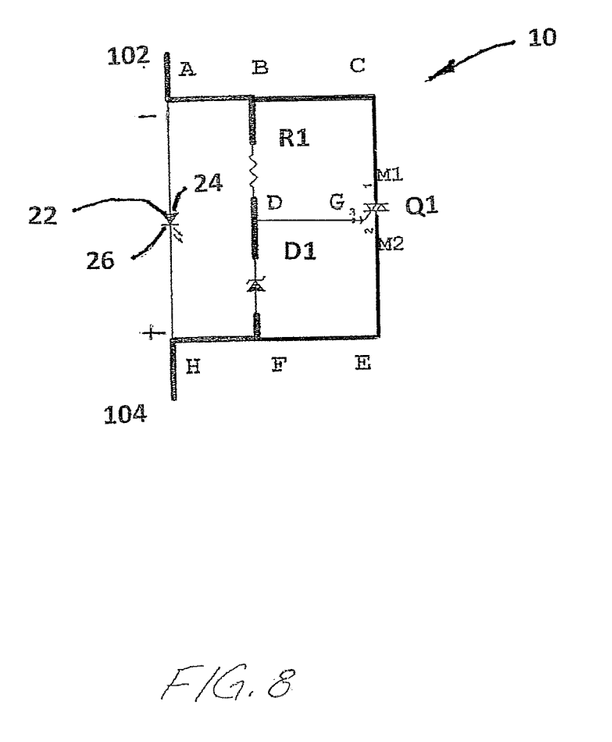
FIG. 8 is a schematic illustrating the resumption of the flow of electrical energy enabled by the disclosed circuit.

The reverse flow of electrical energy continues around the LED 22, thereby protecting the LED 22 from a reverse polarity flow of electrical energy. As shown in FIG. 8, there are two paths for the flow of electrical energy in the bypass circuit. The first is A B D F H, and the second path is A B C M1 M2 EFH. No electrical energy flows through the LED 22, thereby protecting the LED 22. The voltage required for the electrical energy to travel the A B D F H path (about 0.7 volts) and the A B C M1 M2 E F H path (about 1 volt) is low enough that it will not cause the direct current power supply to become inoperative.

The disclosed circuit has been explained according to its preferred embodiment. Those of ordinary skill in the art will understand that other embodiments of the disclosed circuit have been enabled by the foregoing disclosure. Such other embodiments shall be included within the scope and meaning of the appended claims.

What is claimed is:

1. A low power bypass circuit for use with a string of series-connected LEDs, the low power bypass circuit comprising:
   a zener diode connected in series with a resistor which zener diode and resistor combination becomes conductive upon the failure of an LED or the connection of the string of series-connected LEDs to a reverse polarity flow of electrical energy;
   said zener diode and resistor combination causing a triac to become conductive upon the failure of an LED so the flow of that electrical energy no longer flows through said zener diode and resistor combination is reduced by the flow of electrical energy through said triac;
   said zener diode and resistor combination causing a triac to become conductive upon the connection of the string of series-connected LEDs to a reverse polarity flow of electrical energy so that electrical energy flows through said zener diode long enough to cause said triac to become conductive, thereby reducing the flow of electrical energy through said zener diode.

2. A string of series connected LEDs comprising:
   a plurality of individual LEDs connected one to another in series;
   a low power bypass circuit connected in parallel with each individual LED, said low power bypass circuit including:
     a zener diode connected in series with a resistor which zener diode and resistor combination becomes conductive upon the failure of an LED or the connection of the string of series-conducted LEDs to a reverse polarity flow of electrical energy;
     said zener diode and resistor combination causing a triac to become conductive upon the failure of an LED so that the flow of electrical energy no longer flows through said zener diode and said resistor combination and is reduced by the flow of electrical energy through said triac;
     said zener diode and resistor combination causing said triac to become conductive upon the connection of the string of series-connected LEDs to a reverse polarity flow of electrical energy so the electrical energy flows first through said zener diode long enough to cause said triac to become conductive thereby reducing the flow of electrical energy through said zener diode and resistor combination.

3. A method for bypassing an open LED in a string of series-connected LEDs and protecting the integrity of the string of series-connected LEDs if improperly connected to a direct current electrical energy power supply, said method comprising:
   causing a zener diode in a low power bypass circuit to become conductive when an LED becomes non-conductive;
   causing a triac in said low power bypass circuit to become conductive when said zener diode becomes conductive;
   causing the flow of electrical energy through said zener diode to be reduced when said triac becomes conductive;

wherein said triac allows the flow of electrical energy therethrough in a first direction in the open LED condition, and wherein said triac allows the flow or electrical energy therethrough in a second direction in a reverse polarity condition.

4. A light source for an illuminated sign comprising:

one or more direct current electrical energy power supplies;

one or more strings of series-connected LEDs electrically connected to said one or more direct current electrical energy power supplies;

a low power bypass circuit connected in parallel around each LED, said low power bypass circuit including:
- a zener diode connected in series with a resistor, said zener diode and resistor combination becomes conductive upon the failure of an LED or said series-connected LEDs being improperly connected to said one or more direct current electrical energy power supply in a reverse polarity condition orientation;
- said series-connected zener diode and resistor combination causing a triac to become conductive upon the failure of an LED so that the flow of electrical energy through said zener diode and resistor combination is also through said triac;
- said zener diode and resistor combination causing said triac to become conductive upon the connection of said one or more strings of series connected LEDs to a reverse polarity flow of electrical energy so that electrical energy flows is through both said zener diode and resistor combination and said triac.

* * * * *